Feb. 22, 1966  P. S. LITT  3,236,768
WATER PURIFICATION
Filed Aug. 2, 1962  4 Sheets-Sheet 1
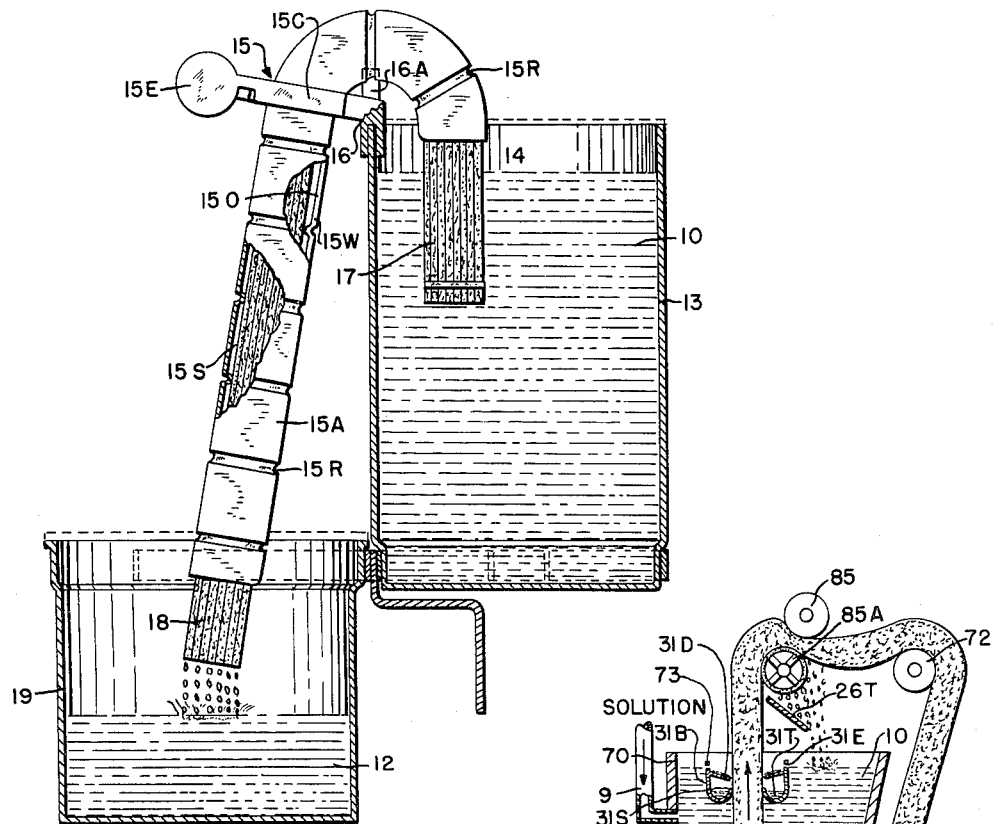
FIG. 1
FIG. 4
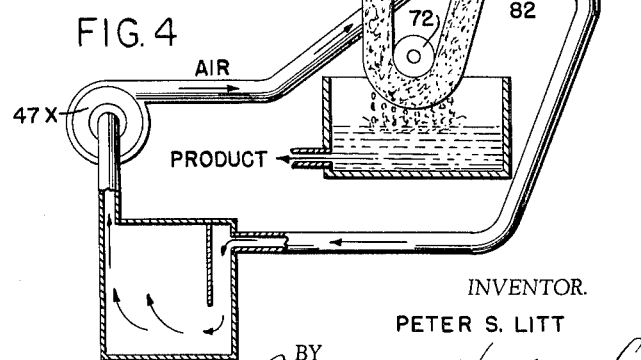
INVENTOR.
PETER S. LITT
ATT'Y.

Feb. 22, 1966 P. S. LITT 3,236,768
WATER PURIFICATION
Filed Aug. 2, 1962 4 Sheets-Sheet 2
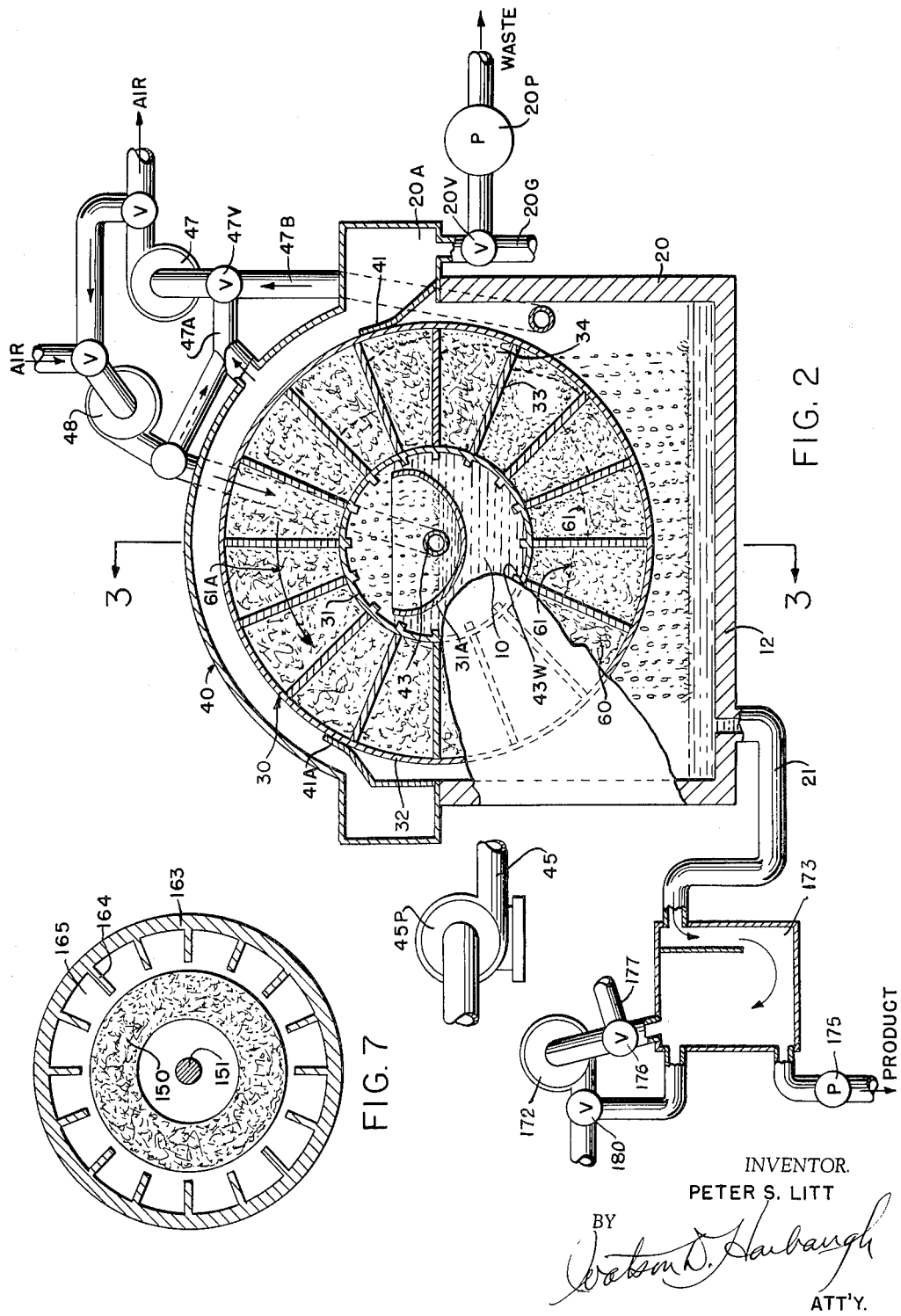
INVENTOR.
PETER S. LITT
BY
ATT'Y.

INVENTOR.
PETER S. LITT

United States Patent Office 3,236,768
Patented Feb. 22, 1966

3,236,768
WATER PURIFICATION
Peter S. Litt, Albuquerque, N. Mex., assignor of twelve percent each to Walter B. Hobbs, Ralph K. Ball, and Watson D. Harbaugh, all of Evanston, Ill.
Filed Aug. 2, 1962, Ser. No. 214,217
8 Claims. (Cl. 210—23)

This application is a continuation-in-part of Serial No. 194,135, filed May 11, 1962 now abandoned and Serial No. 198,355, filed May 28, 1962.

The present invention relates to the method and apparatus for producing fresh water from sewage, brackish, stagnant, industrial wastes, sea and alkaline waters; including water solutions having different specific gravities and different pH readings, ionized and non-ionized.

The principal objects are to provide low cost and high volume methods and devices that reduct the total contaminants present in such waters in single or multi-stage operations, within the range of 50% to 90% per stage; to produce irrigation waters having from 1,000 to 3,500 p.p.m. with a sodium ratio to the total p.p.m. of less than 60% as derived from initial sea water mixtures having approximately 35,000 p.p.m.; to produce drinking waters of less than 250 p.p.m. of inert minerals and soft water of less than 60 p.p.m. (60 p.p.m. being equal to 3.5 (3½) grains hardness) with batch or continuous running equipment of any volume or size.

The invention contemplates: (1) the use of inexpensive and readily available additives, such as calcium hydroxide and calcium sulphate or the like, to control organic particles, including hydrocarbons, that are present in solution in an amount in excess of ionized particles present to attract them, and thereby assist and accelerate the reclamation of both the water and the additives from an organically polluted body of water, which additives are quite safe and are readily detected even in small quantities as a telltale in the product water, if reclamation equipment becomes damaged; (2) controlling the movement of ionically influenced particles of both electrical charges in a body of contaminated water at different rates and speeds than the water molecules therein, and the discrimination of the particles from the water molecules electrically, temporally and spatially for selective removal; (3) reducing all the contaminant particles in feed water to a common denominator of ionization behavior and by capillary diffusion or ionic confusion moving pure water from the feed water more rapidly through a capillary lattice than the ionization influenced particles can travel, or by stratifying the ions to limited portions of the body of water and collecting purified product water from the remaining portion of the body; and (4) reducing a high alkalinity pH (12 to 13) of feed water to a neutral pH (6.5 to 7.5) or in some instances a weakly acidic pH (5 to 6.5) without need of adding neutralizing reagents, and from a low pH to a neutral pH if desired.

Furthermore, the invention in its operation involves no heat exchange or high vacuum procedure either to freeze or distill the contaminated water; nor high pressures or supersonic energies to stress water molecules; nor heavy use of external energy, corrosion or scaling of equipment, replacement of expensive elements including electrodialytic membranes, or undesirable residue of toxic materials that confront conventional methods objected to by public health officials.

The invention contemplates deriving a low cost, residue-free product water from any known bodies of contaminated water of useful size with low cost equipment which operates long periods of time without attendance.

Another object of the invention is to provide a continuous running high volume, small sized water reclamation system for high quality water in one stage which can employ vapor to backwash or purge the equipment when necessary.

Another object is to conserve or eliminate the use of product waters to purge equipment and thereby induce a greater yield of product water from ion contaminated water.

The invention also provides an apparatus for purifying water whose constructional costs and space requirements are a small fraction of conventional equipment; whose moving parts are few and essentially comprise conventional pumps, motors and automatic control elements; whose external energy requirements in large installations are a small fraction of that required for conventional equipment and little or no energy is required in small volume devices such as survival equipment for families, individuals and travel; and, whose apparatus is made of inexpensive, readily available, corrosion and vermin proof materials, including non-frangible dielectric materials, if desired.

Other objects of the invention will be appreciated from the description of the drawings in which several embodiments of the invention are illustrated schematically for carrying out various phases of the process in which:

FIG. 1 is a diagrammatical view of a batch method and apparatus in its simplest form for purifying water in a single stage for survival or family kits or as one of several stages;

FIG. 2 is a diagrammatical view of apparatus showing a preferred embodiment of the invention for continuous operation;

FIG. 4 is a diagrammatical view of another embodiment of the invention for continuous operation;

FIG. 7 is a section taken on line 7—7 in FIG. 6.

Figure 3:
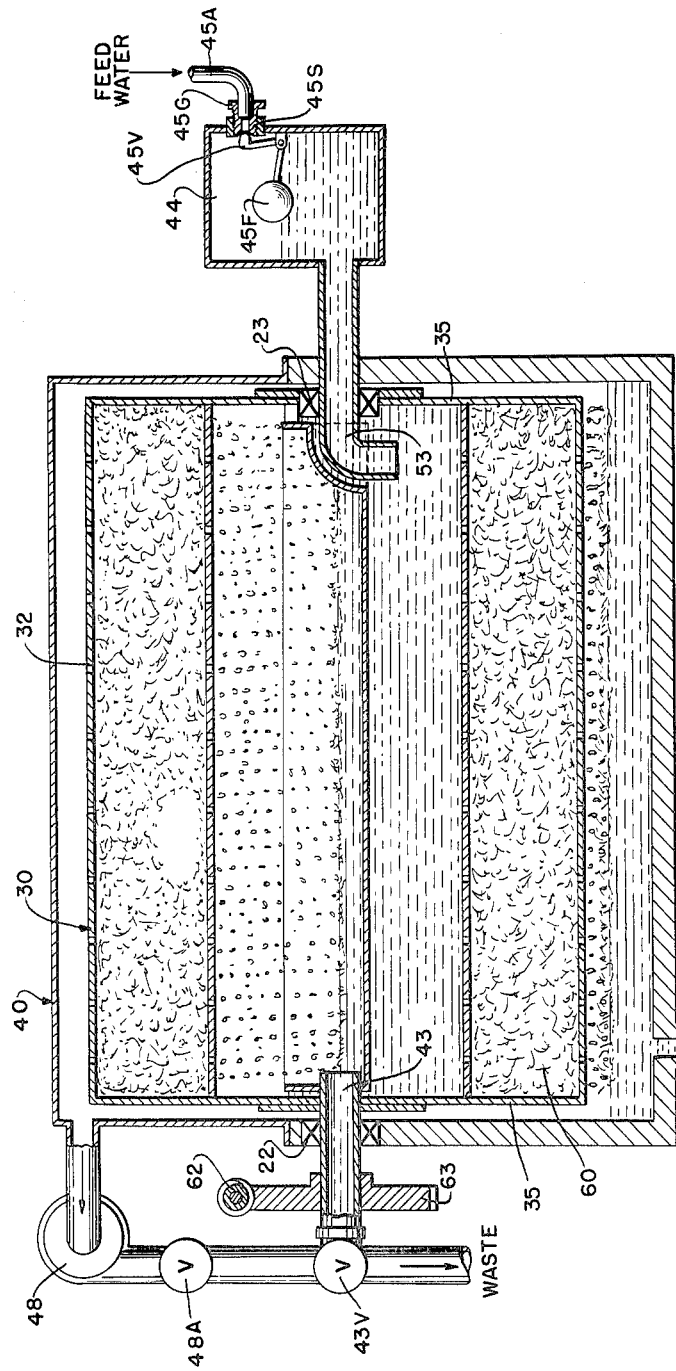
FIG. 3 is a section taken on line 3—3 in FIG. 2.

For better understanding of the invention, I have noted that all water contaminants, other than heavy or gross solids which can be readily removed by conventional mechanical filters, can be handled according to their ionization behavior in a water solution. Some substances such as organic wastes which include microscopic plant and animal micro-organisms, and both soluble and insoluble hydrocarbons including oils and dyes, do not ionize readily in water while other mineral earth compounds partially soluble in water such as inexpensive calcium compounds including calcium hydroxide $Ca(OH)_2$ and calcium sulphate $CaSO_4$ not only ionize in water adequately in small quantities, but also have an affinity for such organic particles in solution.

In the present invention the use or presence of calcium sulphate is preferred when organic particles are present because it is neutral and does not change the pH of the solution. Under some circumstances, however, as with sea water or for particular product waters, advantages may be derived by changing the pH. The use of calcium hydroxide will do this and it may be desirable not to remove any calcium hydroxide which remains in the solution depending upon the end use to be made of the product water. Also it should be noted that it may be desirable to permit the hydrogen ions or the hydroxide radicals to pass through with the water tending to give the end product an acidic pH. Also, some residue may be useful as a soil additive in irrigation.

Otherwise, unless specified, $CaSO_4$ will be referred to herein for purposes of description by way of example and not by way of exclusion of other known ionizing compounds found present in or which may be added to contaminated water for desirable side effects.

$CaSO_4$ is soluble in water up to 2,500 p.p.m. depending upon temperature and altitude. To the extent that a solution is attained the compound is disassociated to form in the solution ion particles $Ca^{++}$ and $SO_4^{--}$. Any $CaSO_4$ present in excess of that which is in solution is not disassociated but remains in suspension without ionization. Where organic materials are present and ion particles are scant, sufficient $CaSO_4$ should be added to provide an ionization effect for all organic particles present. The additive should only be in an amount required because its presence is otherwise generally considered to be a contaminant also. Such an additive can be specified for all organic contamination generally experienced including industrial wastes. Then when intimate contact is established between ionized particles and the dissolved organic particles, the response of the organic particles is controlled or influenced by the action of the ion particles in the subsequent treatment of the solution by capillary diffusion, electrical polarity attraction and electrostatic repulsion and including selectivity related to electrical charge.

I have found that molecules of water in a solution flow more rapidly through a capillary lattice made of an inert and preferably dielectric material than the ion influenced particles which contaminate the water.

"Lattice" as used herein comprises a body or mass preferably comprising a felt-like dielectric matting of inert material defining a labyrinth of minute irregular circuitous capillary passages therethrough such as found in felted fine wool, with or without fine nylon or Dacron reinforcement filaments, and compacted enough not to have any passages of a size which serve merely as siphon conduits.

The water, having little if any electrical charge and molecularly being electrically neutral has a relative freedom of action in the presence of dielectric materials and easily wets them and freely enters into a capillary movement therethrough. On the other hand, ions in solution having electrical charges influencing a wide neighboring region of molecules tend to avoid intimacy with dielectric materials when reasonably free to do so. Also, it has been noted that even the ions and pure water tend to diffuse in the solution itself at an interface involving contiguous materials of different specific gravities and different electrical characteristics. However, ions having H or OH radicals tend to respond and flow like a water molecule (HOH) and tend to provide an acidic pH reading in the product water.

Thus, when the ion contaminated water endeavors to flow through the capillary lattice, the ions forming their clusters of electrical influence are reluctant to break up or enter the dielectric lattice and tend to stay away from the face thereof. Nor can the cluster travel as rapidly as free water molecules in the lattice because the dielectric filamentous material hinders ion movement in the maze of minute irregular capillary passages. The water molecules however move freely ahead, wetting the capillary passages and outdistancing the ions in their movement. This provides an action I refer to as "capillary diffusion" and relative distances of travel remain proportional under varying rates of liquid flow for a given capillary lattice.

When air under pressure is passed through the capillary lattice to blow it free of liquid it also assists in purging the lattice as and after the solution is jettisoned. An air drying effect occurs in the capillary passages which increases concentration of any solution moisture lingering and tends to cause an ion reassociation which permits a rather quick and thorough physical expulsion of particles lingering in the passageways. Whether this is due in part to reassociation of ions in granular form is not clear because a high degree of air purging occurs with capillary lattice materials that are not readily dried. However, in the event any ions reassociated as particles might become trapped in the capillary lattice and not blow free I have found that vibration of the lattice structure by pulsating the air will shake them out, or a subsequent brief flush of pure water, whether as a mist or in droplets carried through by air pressure, will clear the capillary passages quite well for a repeated step of purification of contaminated water by capillary diffusion.

In applications where small amounts of potable water are desired on the order of a gallon per day, a small refillable container can be employed with a "wick"-like capillary lattice made of materials capable of capillary diffusion such as a bendable or laminated felt body of the materials mentioned. The wick must be compacted enough to form capillary passages and not have any passages of a size which serve merely as siphon conduits. One end of the wick is placed in a container holding the solution and the other end is extended over the side of the container. Then without any electrical energy being required the wick in contact with the surface of the quiescent body of the solution will pass pure water by capillary diffusion over the side of the container ahead of the movement of the ions in the wick.

I have found that a molecule of water will travel as much as fifteen times as fast through the wick as an ion. The recovery of product water can continue until the ions begin to come through. Then the wick can be lifted free, purged by flushing rejected ion concentrations from its surface as its feed water end, wrung as dry as possible of partially purified contained water and whipped in the air to free it of particle contamination as much as possible. The container is emptied and refilled with more solution and the wick returned to its working position. Otherwise, with continuous operation the ion reduction in the product water is proportional to the relative speed of travel of water and ions through the wick.

Such a device is shown in FIG. 1 where a survival kit is shown which operates without electricity and only requires personal attention. A mess kit container 13 is filled with solution 10 and a bendable felt-like wick 14 made of compacted fibrous materials to provide the capillary lattice is inserted part way through a clamp ring 15 that is forked as at 16 to be received in supported relationship on the edge of the container and arched at 16a to hold the wick in the shape shown. As thus supported one end 17 is immersed in the solution 10 and the other end 18 is permitted to hang freely above a cup 19 in which the product water 12 is collected. Such is the simplest form of the kit. In order to support the wick in convenient shape it is preferred to provide a stainless steel or Lucite member 15a, looking much like a lobster tail, which also shields the top of the wick to prevent undue evaporation. The member 15a is made preferably of two symmetrical halves joined along the outer edge and provided with wick retaining beads 15w along the inner edges. The member 15a has internally offset ribs 15r to contact the wick surface in a circumferential direction to space the wick surface from the wall as at 15s to prevent any channelling of water between the member 15a and the wick lattice. The member 15a is open along its inner side as at 15o for lateral insertion and removal of the wick therethrough. With the wick supported therein the assembly is received between the two curved spring clamp members 15c manipulated by ears 15e. More than one wick assembly can be used at a time or alternately if desired on the rim of the container 13 if greater production of water is desired in a given time. It will be observed that the cup 19 and container 13 telescope at their open ends to serve as a protective kit housing for storing the other parts when not in use.

The quantity of water recovered in a given length of time is proportional to the cross sectional area and inversely proportional to the density of the wick. The time cycle between purgings is proportional to the length of the wick. Moreover, the less the rise in the wick above the feed water the sooner and faster the water will flow.

For example, a compact wick of fine wool one inch square dependingly immersed two inches in contact with the impure water mixtures from one inch above the mixture and having a depending portion of six inches on the delivery side will produce 10 ozs. of potable water in an hour from sea water having 35,000 p.p.m. comprising ions of chloride, sodium, sulphate, magnesium, calcium and potassium. If not purged, the water will continue to flow faster than the ions and a reduction of ion contamination of as much as 90% can be attained at atmospheric pressure. Whereupon further stages as described may be added to utilize the product water as feed water for accumulative reductions depending on the ultimate purity desired. It should be understood that the percentage may vary if upstream concentration is increased by water withdrawal without precipitation occuring. However, with purging between pure water runs, a potable product water, i.e. below 1000 p.p.m., can be attained in one stage. Also, it is preferred that in multi-stage installations the successive wicks should not be joined. Then the stage reductions are accumulative with the feed water confronted with a lattice surface each time instead of a situation similar to only one long wick. When ions begin to come through, the wick can be lifted free and purged as already described and the container is emptied and refilled and the wick returned to its working position.

A continuous operation apparatus is shown in FIGS. 2 and 3 embodying the invention to recover product water 12 from a feed water 10 contaminated in any of the ways mentioned herein. A trough 20 made either of metal or of reinforced concrete is built to collect product water and supply same to a point of use through an outlet 21. The trough can be mounted on a foundation or trenched into the ground for support.

Journalled at opposite ends on the end walls of the trough 20 by bearings 22 and 23 is a drum 30 preferably fabricated with inner 31 and outer 32 concentric thin foraminous stainless steel tubes made preferably of sintered stainless steel powder affording approximately a fifty micron porosity so as not to resist the flow of solution. Radially disposed imperforate divider walls 33 interconnect the tubes in assembled relationship and provide longitudinally extending peripherally arranged compartments 34 through which fluid may move radially in either direction under gravity or pressure. The compartments are closed at their ends by end walls 35 upon which the support bearings 22 and 23 are mounted.

The compartments 34 are preferably filled with an inert dielectric capillary diffusion lattice of fibrous materials such as described. However, it is preferred that the lattice 60 be substantially compact to withstand the action of any pressures employed. Preferably the lattice is supported by a binder against the divider and end walls 33 and 35 to prevent liquid bypassing the lattice along the faces thereof.

Covering the trough 20 and the upper portion of the drum 30 is a hood 40 suitably sealed to hold air under pressure so that the trough 20 and the drum 30, or just the trough alone, can be subjected to positive or negative gauge pressure as desired. Feed water is supplied to the inner tube 31 to a predetermined level, and also air under pressure if desired. Then the compartments that are in uppermost position are purged by air flowing radially under a pressure drop thereacross and the submerged or lowermost compartments can be supplied with feed water from the tube 31 under pressure.

The hood is removable for servicing the apparatus and the drum 30 can be either removed with the hood or left in place on the trough as desired, suitable fasteners (not shown) being provided.

In order to provide the gauge pressure and the flow and control of feed and product water as suggested, doctor blades are provided at 41 and 41a to prevent water and ions that are purged from the uppermost channels from reaching the product water 12 in the bottom of the trough and also to isolate the hood 40 from the trough 20 if pressure differential therebetween is provided. Accordingly the purged water is directed by the blades to trough 20a and passed to waste therefrom either by gravity through conduit 20g or an evacuation pump 20p depending upon the setting of valve 20v and the presence of negative or positive gauge pressure in the hood 40. Preferably negative pressure may not be required in the hood 40, in which case the pump 20p and valve 20v can be removed from operation.

Two air blowers may be employed to provide and control the pressures desired. Blower 47 provides for negative gauge pressure in either the hood 40 through conduit 47a or in the trough 20 through conduit 47b, or both, depending upon the setting of the valve 47v. Blower 48 supplies air under positive gauge pressure to the inside of the tube 31 through a hollow bearing shaft at 43 where it exerts a downward pressure on feed water therein and also blows upwardly through the compartments 34 to purge them to waste as already mentioned.

In order to maintain a predetermined level of feed water in the tube 31 and correct it as desired, the interior of the tube 31 is in free communication with a liquid level control tank 44 having an inlet 45a from the feed water pump 45p as controlled in a well known manner by a float valve 45b. This level is varied by the inlet pipe 45a being provided with a shouldered valve seat 45s and an externally accessible gland unit 45g for adjusting the seat 45s towards and away from a valve head 45v controlled by a float 45f. Air pressure is equallized between the tube 31 and the tank 44 and as feed water is dissipated the level in tube 31 is maintained by free flow therebetween.

The gradual advancing ion fronts in the submerged lattices are indicated diagrammatically by broken lines 61 when the rotation of the drum is in the direction of the arrow 61a. Thus in the lower half of the drum the pure water flows through ahead of the ions by capillary diffusion and before the ions begin to appear the lattices are successively purged to waste; the pure water just ahead of the ions back washing the lattice to be followed by air under pressure.

In operation, although two blowers 47 and 48 are shown, one may suffice to maintain a predetermined pressure drop of as much as five p.s.i. across the lattices 60 and with a negative gauge pressure in both the hood 40 and the trough 20, flow of fluid from the tube 31 is accelerated outwardly the closer it gets to the periphery. With an increasing negative gauge pressure on submerged lattices, the water molecules become more animated and not only flow faster but outdistance the ions at a greater rate for a greater yield. Then when the lattices rise above the feed water level, air begins to flow through the compartments and jettison therefrom the water present in the lattice with compulsive flow that purges the ions along with the water.

An alternate operation is provided which is preferable with valve 47v closed. Then through valve 48a the output of the blower 48 provides a positive gauge pressure in the hood 40 and the valve 43a is opened to waste so that when the doctor blade 41 is cleared successively by the compartments in their cyclic movement upwardly the air pressure in the hood is effective to jettison the water and purge the compartments in a counter flow direction, namely inwardly back into the inner tube.

For purposes of this method of purging a semicylindrical trough or catch 31a is journalled on the shaft 43 at one end and supported on element 53 against rotation at the other end. The catch opens upwardly to receive the back flow water of higher concentration and drain it to waste through the valve 43v and vanes 43w on the tube 31 not only move any precipitation present but also assure drainage of the jettisoned water to the catch 31a. The air pressure above the feed water 10 is residual, being partially trapped by limiting the amount permitted to escape with the waste water. Thus air coming through the compartments maintains a low pressure above the feed water for the compartments for the reclamation portion of their cycle.

With a lattice thickness of two inches of closely compacted fine wool and a negative pressure of one to five p.s.i. in the trough 20 the drum can be rotated as slowly as one r.p.m. and with the temperature of the feed water as low as possible to benefit from the sluggishness of the ions a recovery of pure product water in large amounts is accomplished as a continuous operation.

Furthermore, it also appears that with the forced flow of feed water, the sectional flow area in each unit 60 is gradually increasing radially outwardly for a pressure drop across the capillary lattice. The flow of water ahead of the ions is faster. Moreover, when the feed water remaining in the uppermost units is jettisoned inwardly by the air the sectional flow area becomes a decreasing one and the pressure and flow rate provides a scouring activity favorable to purging. The drum may be rotated in either direction by the variable speed worm drive 62 acting on the worm wheel 63 and the speed of rotation is adjusted so that ions in the submerged compartments do not quite reach the outer surface of the drum.

Then with the utilization of the air pressures described, the speed of rotation of the drum can be varied because the application of pressure assists the flow of product water ahead of the ions to the extent that the clustering of ions at the beginning of the capillary passages increases and further inhibits ion pursuit of product water. The yield of product water is thereby increased more than proportionally for certain usable grades of water, it being appreciated that the speed of rotation of the drum is related to the radial thickness of the lattice as well as the pressures employed. The deeper the diffusing units, the slower the drum can be rotated, or the higher the pressure differential that can be used, provided that the pressure drop to the pressure existing beyond the capillary lattice is reached by the product water while still within the capillary lattice.

Referring now to FIG. 4, a continuous operation apparatus is shown where a belt-like lattice 71 is moved countercurrent to provide high grade product water. A container 70 having an inlet at 9 for solution 10 is also provided with a weir 73 which permits overflow of solution 10 to wash away and carry to waste ions collecting at the surface of the lattice belt 71. An opening 74 is provided at the bottom 75 of the container and below this opening is a passageway 74a having one wall at 77 movable horizontally to narrow or widen the cross-sectional area of the passageway. This movement may be accomplished hydraulically or by spring pressure, but as shown, a rack gear arrangement 78 is shown carrying a head 79 defining the wall 77 as sealed against leakage by a diaphragm 83. The continuous belt 71 is shown as mounted upon pulleys 72 to move through and fill the passageway 76, and be compressed a predetermined degree between the walls thereof.

Where the belt leaves the passageway and enters the container it is in contact with the solution 10 above the opening 74. Water, by capillary diffusion and under gravity begins to move inwardly and downwardly through the belt leaving behind ions collected on the faces of the belt lattice. Some ions accompany the water but since the ions travel more slowly, a rate which may differ for different belting material, the water outdistances the ions as helped immediately by gravity and ultimately flows from the bottom of the belt into the collection container 84 as purified of product water.

However, what ions enter the lattice, though reduced in number, could ultimately begin to come through, except that in this embodiment, the belt is moved upwardly bodily at the same or slightly greater rate of speed than the ions move downwardly in the belt but at a speed less than that of the water molecules therethrough. Consequently, purified water and only purified water ever gets through the passage 76.

As the belt is thus moved upwardly from the opening 74, it is saturated with solution having a reduced number of ions in it and bearing a concentration of ions on its surface. The feed water as illustrated is so introduced as to provide a washing away of ions from this surface of the wick. This is accomplished by catches 31b supported along opposite sides of the belt 71. The catches have troughs 31t with upwardly extending lips 31s resting in contact with the belt so as to catch drainage from the sides of the belt that washes ions into them from above. The upper outer edges of the catches 31b are adjustably located a little below the feed water level and are provided with perforate edges 31e to control the amount of flow of water. Inclined drain boards 31d direct the flushing water into and against the sides of the belt. The drain boards may not be necessary in some installations where adequate semi-purified water in the belt drains down and out of the belt above the drain lips 32s.

Thereafter the belt with limited ions in it is passed between two wringer rollers 85, one of which, 85a, is foraminated, which squeeze the remaining portion of the solution of reduced ions out of it to permit such to be caught in trough 26t and returned to the container 70 to dilute the feed water therein. Of course, some ions will remain in the belt along with residual solution therein and if permitted to remain there these will be flushed into the product water if the belt is not purged some place else in its travel as by air at 82 or possibly by product water. But the amount of the ions is slight if not purged, same being proportional to the residual semi-purified solution not squeezed out. Thereafter a second stage run can then be made if greater purity is desired.

But if the belt is purged by the air, the product water will be high grade water for immediate use. In order to do this, blower 47x is employed to pressurize air to nozzle 82p and vacuumize air to nozzle 82v. The nozzles are arranged to be directly opposite each other and rest against the belt to move air through the belt at any desired pressure differential. Residual solution thus purged from the belt is collected in a reservoir and disposed of as desired. It could be product water acceptable for some purposes.

The belt is preferably made of woven and fluffed fibers having a high affinity for water such as wool, and reclamation is controlled in part by the degree or greater closeness to which these fibers are brought by the compression induced by the head 79. Thus, the grade of the water rendered is variable to some degree depending upon factors of quantity and purity desired. The less the compression, the greater the flow with some possible reduction in quality with some ions permitted to pass through.

Figure 5:
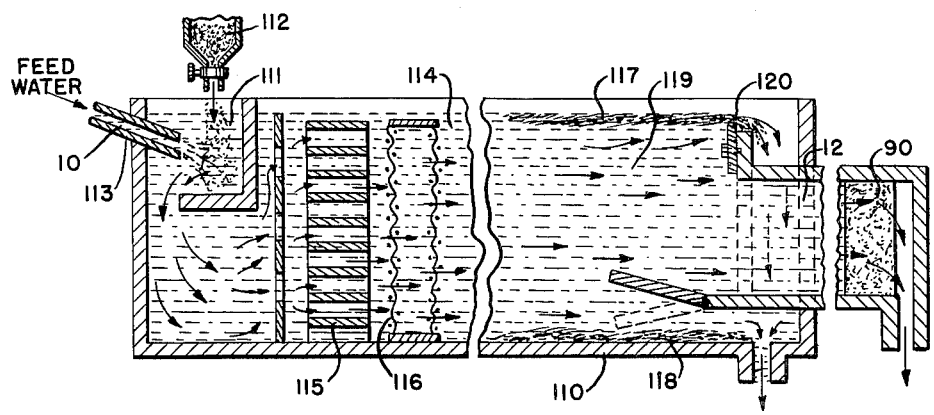
FIG. 5 is a diagrammatical view of a continuous running apparatus embodying the invention for reclaiming water from solutions including salt.

Referring now to FIG. 5, I have also found that sea water having approximately 3.5 salinity can have as much as 70% of the salt removed therefrom in one operation by mixing it with at least two pounds of calcium hydroxide per thousand gallons, permitting the solution to stratify in a flotsam of high saline concentration on the top and in a precipitate of high saline concentration on the bottom, and then separating therefrom the water from the intermediate strata as a product water having a salinity of 1% or less before the solution can remix. The process can be repeated to provide .3% salinity which is an acceptable irrigation water having desirable soil additives including the calcium hydroxide. This can be done with other solutions, such as alkaline water, etc., having a pH below 9. Furthermore, the secondary stages can be performed by the embodiment previously described (FIG. 4) if purer water without hydroxide in it is desired or a capillary lattice can be disposed in the path of flow of the product water to provide water having an acidic pH.

In each successive operation the charge of hydroxide can be correspondingly reduced. In each instance, the time is of some importance because the time between the reaction which produces stratification and the time remixture and reabsorption occurs, can be as little as five minutes. Moreover, although the reaction occurs with optimum success with the temperature of the water as low as 40° F. it will perform with a slower reaction, with temperatures at room temperature.

An excess of lime in moderate amounts is tolerated so that close measurement is not necessary, it being appreciated that lime can be left in the solution in part and in the slurry in part but minimal amounts can be controlled by close measurements if desired.

For carrying out the calcium hydroxide process mentioned, a continuous running embodiment is shown in FIG. 5 in which an elongated trough or vat 110 having a mixing chamber 111 is supplied with calcium hydroxide from a sifter 112 and contaminated water 10, such as sea water, from a conduit 113 to provide a solution of higher pH. The solution flows into the main portion 114 of the vat. In the main portion the vat is provided with rectilineal flow control grills 115 and coarse screens 116 to quiet and move the solution quietly through the vat from the mixing chamber. As the solution flows quietly the saline floc 117 floats and the saline precipitation 118 drops, within five minutes leaving the intermediate layer 119 of water of reduced saline concentration but of increased pH. Beyond the point of accomplishing this stratification, the end of the vat is of reduced height with a variable height weir 120 to permit the flotsom to flow to "waste." At the bottom of the vat a variable volume drain opening 121 is provided to remove the precipitous water of higher concentration, leaving the intermediate layer of purer water 12 to flow to a point of use. In the path of flow of the intermediate layer a lattice 90 capable of capillary diffusion may be disposed to remove the calcium ions and reduce the high alkalinity pH caused by the calcium to a neutral or near neutral pH 6.5 to 7.5 without any need for adding neutralizing reagents.

Although a "water falls" type of mixer is shown, it is understood that mechanical mixers can be used or the calcium hydroxide may be placed in solution and supplied by liquid injection.

Figure 6:
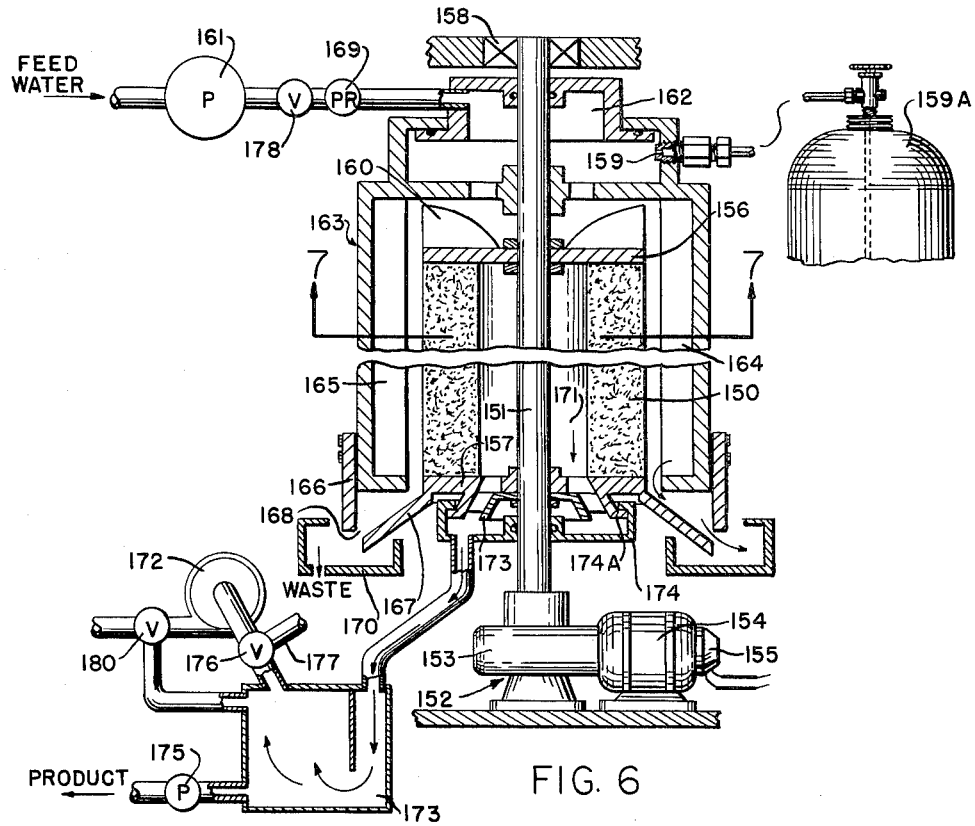
FIG. 6 is a sectional view of another embodiment of the invention.

In FIG. 6, centrifugal force is employed to assist in retarding or inhibiting ions entering a capillary lattice. Ions being found to be heavier than water molecules, they can be urged by centrifugal force not to accompany water molecules that move centripetally. A quiescent body of feed water is centrifuged with sufficient force that the ions tend to move outwardly and at the same time that water molecules are forced to move inwardly into wetting contact with a capillary lattice under pressure that counteracts or exceeds the centrifugal force.

A capillary lattice 150 in the form of a cylinder is mounted on a shaft 151, preferably disposed vertically and rotated by a variable speed drive 142 which may include speed reduction gearing 153 driven by an electrical motor 154 having an adjustable speed governor 155. The shaft 151 is journalled by a bearing 158 at the top. The top and bottom of the lattice are sealed by end plates 156 and 157 which support the lattice for rotation by the shaft 151.

The upper plate 156 has radiating vanes 160 on the upper surface thereof to induce bodily rotation and a centrifugal propulsion outwardly of feed water supplied to it by pump 161 through a pressure regulator 169 and the manifold 162 to bring it up to the speed of the rotating lattice. A shell 163 covers the top and sides and rotates with the lattice 150. The shell also has vanes 164 longitudinally therein which extend into close proximity with the lattice 150 and not only serve to keep the water up to speed for centrifuging but also to provide vertical channels 165 which confine the water to flow vertically in contact with the lattice. It should be noted that the flow through the channels can be upwardly if desired or downwardly as shown.

Here again a low temperature in the neighborhood of 40° F. may be helpful and can be accomplished by direct refrigeration with the injection of a liquified gas in its liquid phase into the manifold 162 by a nozzle having an orifice 159 supplied in its liquid phase from a pressure tank 159a.

The residue being organic, can be controlled by ionic additives, if necessary, as already described by the centrifugal force as safeguarded by capillary diffusion that exists with the lattice 150.

At the bottom of the channels the outflow of feed water is metered to "waste" to provide a back pressure in the vertical channels controlled in conjunction with the pump 161 and the pumping action of the vanes 160. The metering is accomplished by a vertically adjustable ring 166 that cooperates with the flange 167 on the lower plate 157 to provide a variable orifice 168 which discharges to a collector 170 and flows to waste as shown.

Water contacting the lattice will enter the lattice and move inwardly to the center 171 and downwardly to baffles 173 which direct it for use as product water into a catch basin 174 having a running seal at 174a with baffles 173. This flow of the water through the lattice is augmented by the center 171 being subjected to a negative gauge pressure by a pump 172 through a catch reservoir 173 emptied of the product water by a high lift pump 175 for use.

For purposes of purging the lattice 150 occasionally when desired, a valve 178 on the feed water line may be closed and the valve 176 opened to atmosphere at 177 and closed to the catch basin 174. Valve 180 on the output of pump 172 is changed to divert air pressure into the catch basin and this air is effective to purge the lattice 150 outwardly as the feed water is centrifugated and drained from the shell 163. After a purging the valves can be changed back for further reclamation of water.

The speed of rotation of the lattice need be only that which would develop enough centrifugal force to cause the water to leave the outer surface of the lattice. Under such a force, or a greater one, the ions which are heavier than water molecules tend to move outwardly away from the lattice. It only remains then to provide sufficient pressure and volume in the channels 165 that the innermost surface of the water body in the channels contacts the lattice whereupon with capillary action of the lattice the water molecules move inwardly in a direction of diminishing centrifugal force and ultimately flow from the center 171. The vanes 160 at the top generally develop a centrifugal force that operates as a proportionally equalizing centripetal force on the water in the channels.

However, it has been found that with a greater centrifugal force, ion discrimination is improved and with a centripetal pressure on the feed water in the channels great enough to appreciably overcome the greater centrifugal force, quality and quantity of product water is further improved. Thus by adjusting the presusre on the feed water as determined by adjustment of the pressure regulator 169, adjustment of the speed governor 155 and adjustment of the orifice 168, the amout of feed water loss can be controlled.

In some respects we are not able to account fully for the improved results which are obtained by the method and apparatus of this invention, and it should be understood that any attempt to analyze the theory which is believed to be responsible for these results is to be construed not as defining a mode of operation, but merely as a possible explanation of certain physical, electrical, or chemical phenomena which have been observed.

Having thus described the invention and various embodiments thereof it will be appreciated by those skilled in the art how the objects and operation of the invention set forth herein are fulfilled and accomplished and how various and further embodiments and modifications can be made including by reference, those of my co-filed applications, Serial Nos. 194,135, filed May 11, 1962 now abandoned and 198,355, filed May 28, 1962 without departing from the spirit of the invention, the scope of which is commensurate with the appended claims.

What is claimed is:

1. The process of purifying feed water contaminated with ionic particles comprising
   subjecting the ionic particles in the feed water to centrifugal force,
   withdrawing water molecules under centripetal forces from the feed water through a capillary lattice consisting essentially of matted filamentous inert dielectric material compacted enough to provide capillary-like passages and eliminate any passages serving merely as siphon conduits and including
   applying a pressure differential across the capillary lattice that counteracts the effect of the centrifugal force upon water molecules,
   moving the water molecules through the lattice by capillary action with the lower pressure that exists beyond the lattice being reached by the product water while the water molecules moving by capillary action are still within the capillary lattice, and
   withdrawing the water molecules from the lattice at said lower pressure.

2. The process of purifying feed water contaminated with ionic particles comprising
   bringing the feed water into contact with one side of a capillary lattice consisting essentially of matted filamentous inert dielectric material compacted enough to provide capillary-like passages and eliminate any passages serving merely as siphon conduits and,
   subjecting the ionic particles in the feed water at said contact to a gravitational force in a direction retarding their entrance into the lattice,
   retarding by capillary diffusion the movement through the lattice of ionic particles entering the lattice,
   applying a pressure differential across the capillary lattice that counteracts the effect of the gravitational force upon capillary movement of water molecules through the capillary lattice away from said contact to provide a product water with the lower pressure that exists beyond the lattice being reached by the product water flowing with capillary movement while still within the capillary lattice,
   and withdrawing the product water from the lattice ahead of the ionic particles retarded by capillary diffusion in the lattice.

3. The process defined in claim 2 in which said ionic particles include organic particles influenced by anion and cation particles dissociated from a group consisting of calcium hydroxide and calcium sulphate.

4. The process called for in claim 2 including reversing the pressure differential across the capillary lattice to force air through the lattice to purge the lattice when desired.

5. The process of purifying feed water contaminated with ionic particles comprising
   conducting the feed water into one side of a capillary lattice consisting essentially of matted filamentous inert dielectric material compacted enough to provide capillary-like passages and eliminate any passages serving merely as siphon conduits, and
   moving the water molecules freely through the lattice by capillary action,
   retarding the movement of ionic particles through the lattice by capillary diffusion and gravitational forces,
   subjecting said lattice to a negative gauge pressure that counteracts the effect of the gravitational force at the other face of said capillary lattice for maintaining the free flow of water molecules throughout the lattice by capillary action.

6. The process called for in claim 5 including applying air under pressure to said other face for flow through the lattice in the direction of said gravitational forces to purge the lattice when desired.

7. The process of purifying feed water contaminated with ionic particles comprising
   bringing the feed water into contact with one side of a capillary lattice of substantial depth consisting essentially of matted filamentous inert dielectric material compacted enough to provide capillary-like passages and eliminate any passages serving merely as siphon conduits, and
   subjecting the feed water to capillary diffusion in the lattice in which water molecules freely enter and flow through the capillary lattice by capillary action and the ionic particles are retarded in their movement,
   subjecting the ionic particles and water molecules in the feed water and the lattice to a gravitational force in a direction retarding the entrance and flow of the ment while still within the capillary lattice,
   applying a negative gauge pressure to the other side of the lattice counteracting the effect of the gravitational forces upon the movement of the water molecules by capillary action throughout said depth of the lattice with the negative gauge pressure level reached by the water molecules flowing with capillary movement while still within the capillary lattice
   and withdrawing the water molecules from the lattice at said negative gauge pressure.

8. The process defined at claim 7 in which said gravitational force is a centrifugal force.

References Cited by the Examiner

UNITED STATES PATENTS

| 2,670,849 | 3/1954 | Dunmire. | |
| 2,681,252 | 6/1954 | Tuttle | 222—187 |
| 2,881,127 | 4/1959 | Hetzel | 210—30 X |
| 2,986,307 | 5/1961 | Hillebrand | 222—187 |

OTHER REFERENCES

Article in Saline Water Conversion Report of 1960 by The Office of Saline Water, U.S. Dept. of Interior, January 1961, pp. 37–38.

Ellis: Fresh Water From The Ocean. Copyright 1954 by The Conservation Foundation, Inc., pp. 75–76 relied upon.

Girand: Production of Bicarbonate Alkalinity. Journal, American Water Works Association, vol. 51, January–June 1959, pp. 728–732.

Report No. 27 Saline Water Conversion, Advances in Chemistry Series, American Chem. Society, Washington, D.C., 1960, pp. 192–198, p. 198 particularly relied upon.

MORRIS O. WOLK, *Primary Examiner.*